Figure 1:
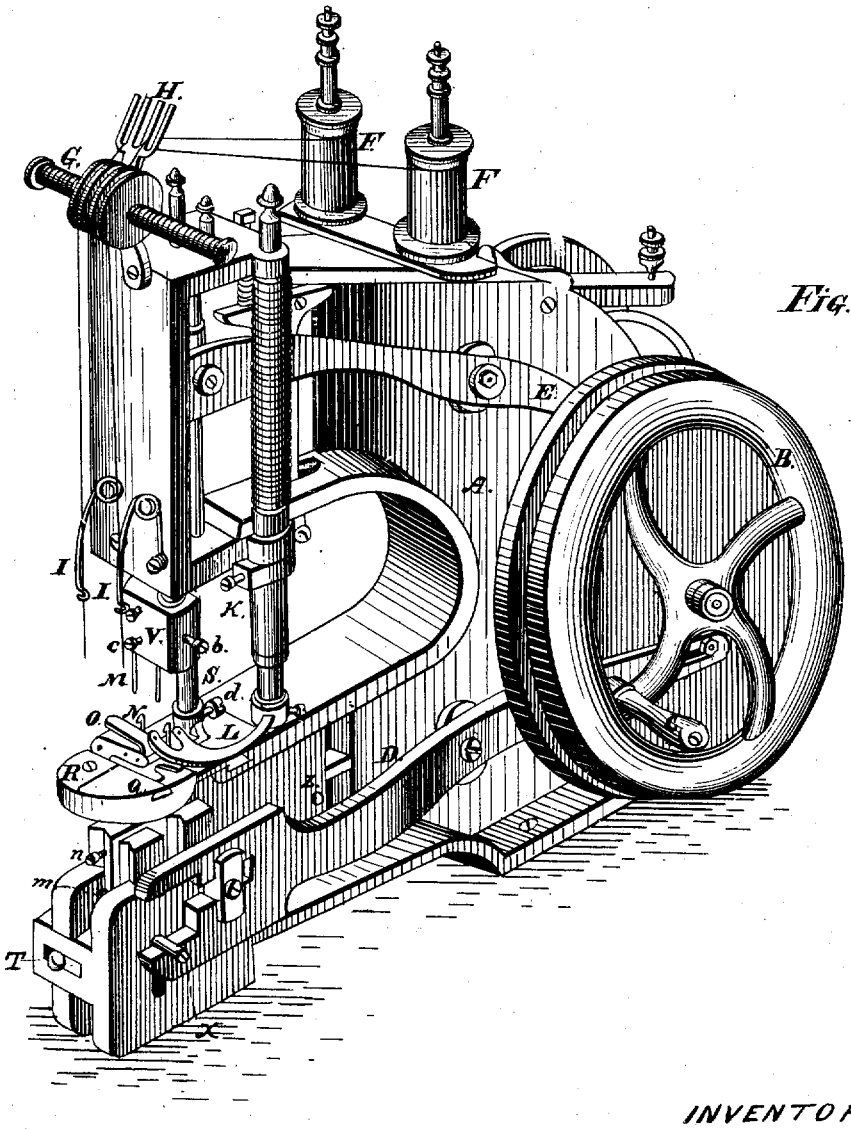

BEST AVAILABLE COPY

E. SHAW,

Assignor of one-half interest to C. F. BRADLEY and W. H. METCALF.

Sewing-Machine.

No. 8,865. Reissued Aug. 19, 1879.

INVENTOR:
Elijah Shaw

WITNESSES:
J. B. Smith
Thomas Lull.

THE NORRIS PETERS CO., PHOTO-LITHO., WASHINGTON, D. C.

2 Sheets—Sheet 2.
E. SHAW,
Assignor of one-half interest to C. F. BRADLEY and W. H. METCALF.
Sewing-Machine.
No. 8,865. Reissued Aug. 19, 1879.
*Fig. 2.*
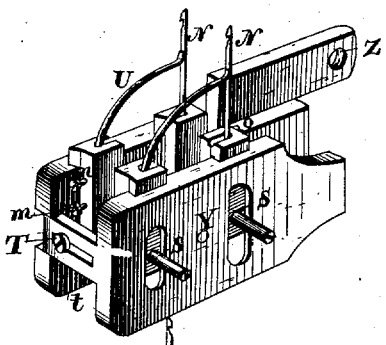
*Fig. 3.*
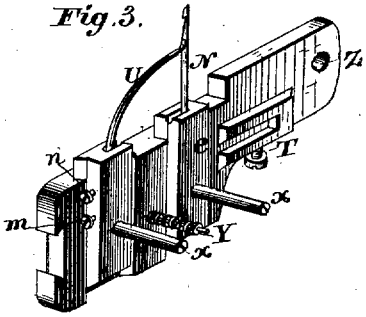
*Fig. 4.*
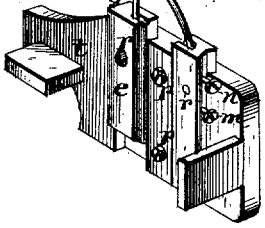
*Fig. 5.*
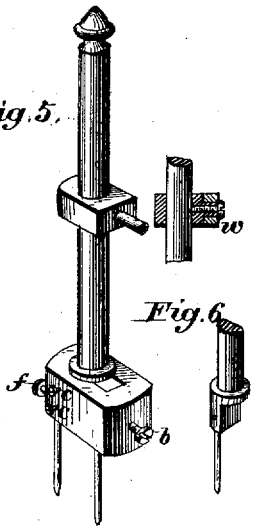
*Fig. 7.*
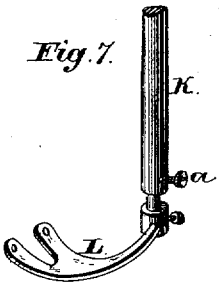
*Fig. 6.*
*Fig. 8*
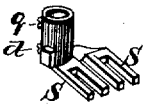
*Fig. 9.*
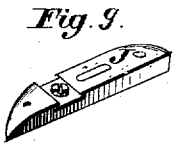
*Fig. 10.*
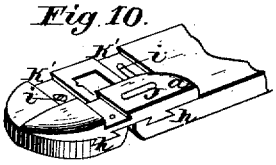
*Fig. 11.*
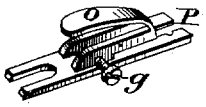
*Witnesses:*
J. Henry Kaiser.
F. S. Blanchard.
*Inventor:*
Elijah Shaw
per E. B. Stout
Attorney
THE NORRIS PETERS CO., PHOTO-LITHO., WASHINGTON, D. C.

UNITED STATES PATENT OFFICE.

ELIJAH SHAW, OF MILWAUKEE, WISCONSIN, ASSIGNOR OF ONE-HALF INTEREST TO CHARLES T. BRADLEY AND WILLIAM H. METCALF.

IMPROVEMENT IN SEWING-MACHINES.

Specification forming part of Letters Patent No. 132,326, dated October 15, 1872; Reissue No. 6,343, dated January 4, 1876; Reissue No. 8,865, dated August 19, 1879; application filed January 12, 1878.

*To all whom it may concern.*

Be it known that I, ELIJAH SHAW, of the city and county of Milwaukee, in the State of Wisconsin, have invented certain Improvements in Sewing-Machines, of which the following is a specification.

My invention consists in the combination, with a lap-seam gage, of a double thread-carrier, double presser-foot, two awls, two needles, and two cast-offs; also, in the combination of an arm and collar with an awl-bar and awl; also, in an adjustable needle-board, adjustable presser-foot, adjustable awl-holder, and adjustable needle-carriage, as will be hereinafter more fully described.

Referring to the drawings forming part of this specification, Figure 1 is a perspective view of my invention; Fig. 2, a view of adjustable needles and loop-carriage; Fig. 3, a sectional view of adjustable needles and loop-carriage; Fig. 4, a sectional view of the other half of needles and loop-carriage. Fig. 5 is a view of the awl-bar, with adjustable awl-fastenings. Fig. 6 is a view of the awl-bar; Fig. 7, the adjustable thread-carrier; Fig. 8, the adjustable foot; Fig. 9, half of needle-plate; Fig. 10, the other half of needle-plate; Fig. 11, lap-seam and cord gage.

In the drawings, A is the frame of the machine. B is the balance-wheel. C is the crank. D is the needle and looper-arm. E is the awl-arm; F, the thread-spool; G, tension-rollers; H, thread-guides; I, tension-springs; K, thread-carrier bar; L, thread-carrier; M, the awls; N, needles; O, lap-seam and cord-gage; P, end gage; Q and R, needle-plates; S, adjustable foot; T, set-screws which hold adjustable needle-carriage in place.

U U are cast-offs; V, adjustable awl-holder; *w*, adjustable collar on awl-bar, which performs the function of holding the awl-bar higher or lower, as it may be placed, and also for holding it so that the awls shall be in line with and exactly over the needles N; *x x*, guide-pins to the cast-off and needle-bars; *y*, screw for adjusting the needles and cast-off the proper distance apart; Z, a screw for attaching the needle and looper-carriage to the feed-bar; *a*, set-screw to adjust the thread-carrier the proper height; *b*, set-screws for holding one of the awls in the holder; *c*, set-screw for holding movable awl-holder in adjusted position on the awl-bar; *d*, set-screw to adjust the foot the proper width; *e*, needle-bar; *f*, set-screw to hold awl in awl-bar; *g*, set-screw for setting lap-seam gage; *h h*, slides for adjusting needle-boards; *i i*, slots in needle-board for the needles and awls to pass through; J J, slots in needle-plates for needles to pass through; *k*, slots in which the slides *h* move; *m m*, set-screws for fastening cast-offs in their sockets; *n*, screws for adjusting cast-offs to the needles; *o*, set-screws for setting needles in the needle-bars; *p p*, screws which hold a dovetail piece between needles and cast-off bars, to hold them in their places; *q*, a set-screw which holds foot on presser-bar; *r*, holes for guide-pins *x x*; *t*, loop and needle carriage.

The operation of my invention is as follows: By turning the crank the cams give motion to different parts of the machine. The awls pass down and pierce holes in the leather, the thread being properly adjusted in the thread-carrier.

When the needles have passed up to the proper height the thread-carrier will throw the thread over the barbs of the needles the needles then passing down until the points come even with the points of the cast-offs. Then they and the needles pass down together until they get a proper distance below the needle-board to form the loop. These needles, awls, and cast-offs operate upon the thread in the usual manner.

The gage is adjusted to lap the material the proper width, and the edges of the material are placed in the slots of the guide. The machine may then be started, and the boot-leg or other article will be sewed by two seams with edges overlapping.

What I claim as new, and desire to secure by Letters Patent, is—

1. The double thread-carrier, the double presser-foot, the two awls, two needles, and two cast-offs, in combination with a lap-seam gage, all constructed to operate as set forth.

2. The combination of arm E, collar *w*, awl-bar, and awl *m*, substantially as described.

3. The combination of adjustable needle-board, adjustable presser-foot, adjustable awl-holder, and adjustable needle-carriage, as set forth.

ELIJAH SHAW.

Witnesses:
J. B. SMITH,
THOMAS LULL.